United States Patent
Mishra et al.

(10) Patent No.: US 9,985,955 B2
(45) Date of Patent: May 29, 2018

(54) SYSTEM AND METHOD FOR SINGLE SIGN-ON FOR THICK-CLIENT APPLICATIONS

(71) Applicant: ILANTUS TECHNOLOGIES PVT. LTD., Bangalore (IN)

(72) Inventors: Ashutosh Kumar Mishra, Bangalore (IN); Sateesh Kulkarni, Bangalore (IN)

(73) Assignee: ILANTUS TECHNOLOGIES PVT. LTD., Bangalore (IN)

( * ) Notice: Subject to any disclaimer, the term of this patent is extended or adjusted under 35 U.S.C. 154(b) by 189 days.

(21) Appl. No.: 15/096,753

(22) Filed: Apr. 12, 2016

(65) Prior Publication Data
US 2016/0301686 A1  Oct. 13, 2016

(51) Int. Cl.
*H04L 29/06* (2006.01)
(52) U.S. Cl.
CPC ...... *H04L 63/0815* (2013.01); *H04L 63/0807* (2013.01)
(58) Field of Classification Search
CPC .......................... H04L 63/0807; H04L 63/0815
See application file for complete search history.

(56) References Cited

U.S. PATENT DOCUMENTS

| | | | | |
|---|---|---|---|---|
| 8,196,189 B2 * | 6/2012 | Roskind | ................. | G06F 21/31 380/255 |
| 8,650,249 B2 * | 2/2014 | Canning | ............. | H04L 67/2819 709/203 |
| 8,799,770 B2 * | 8/2014 | Morris | .................... | G06F 9/445 715/234 |
| 9,607,143 B2 * | 3/2017 | Strand | .................... | G06F 21/45 |

* cited by examiner

*Primary Examiner* — Beemnet Dada
(74) *Attorney, Agent, or Firm* — Barry Choobin; Patent 360 LLC

(57) ABSTRACT

The embodiments herein provide a system and method to enable a single sign-on into a plurality of thick-client applications through an external application. The system includes an authentication module for authenticating the user credentials for the plurality of thick-client applications received by a receiving module. The authenticated user credentials for the plurality of thick-client applications is stored in a data based and encrypted with an encryption module. The plurality of thick-client applications is launched with a launching module. A display module is provided to display the user credentials for launching the plurality of thick-client applications.

9 Claims, 3 Drawing Sheets

SYSTEM AND METHOD FOR SINGLE SIGN-ON FOR THICK-CLIENT APPLICATIONS

CROSS REFERENCE TO RELATED APPLICATIONS

Benefit is claimed under 35 U.S.C. 119(a)-(d) to Foreign application Serial No. 710/CHE/2015 filed in India entitled "A SYSTEM AND METHOD FOR SINGLE SIGN-ON FOR THICK CLIENT APPLICATIONS", on Apr. 13, 2015, which is herein incorporated in its entirety by reference for all purposes.

BACKGROUND

Technical Field

The embodiments herein are generally related to a system and method for single sign-on in a computing device. The embodiments herein are particularly related to a system and method to enable single sign-on using an external application. The embodiments herein are more particularly related to a system and method to enable single sign-on using an external application for a thick-client.

Description of the Related Art

Single Sign-on is a mechanism for logging on to multiple digital applications through one centralized application and single login credential. This is greatly beneficial to the users who handle multiple digital applications since the Single Sign-on users are saved from a trouble of remembering multiple login credentials.

It is, however, difficult to integrate a single sign on for thick-client applications such as Microsoft Office, on personal computers. One of the conventional techniques for Single Sign-On (SSO) for thick-client includes leveraging on the existing enterprise sign-on solutions. According to this technique, the single sign-on is developed based on a workflow model. Further, this technique uses a screen-scraping concept to detect the integration of thick-client and perform a filling process of user's credentials to achieve sign on. However, this technique, based on screen scraping, is undesirable as the sign-on breaks, when there is a change in the screen resolution. Further, this conventional technique leaves a heavy footprint that requires heavy server configurations to be supported. Furthermore, this technique requires technical expertise and external consultation that increases time consumption and costs.

Another conventional technique for integrating single sign-on for thick-client application is by leveraging the desktop application development frameworks. According to this technique, the desktop development frameworks are developed to achieve a sign-on solution for thick-clients. According to this technique, an executable application is developed and deployed using these frameworks so that the developed executable application is run based on a preset event. The example for such an event is the detection of whether a particular desktop application is opened and user credentials are injected to achieve sign-on. However, this technique is undesirable as it is not compliant with one or more cross platforms. Further, the technique requires lengthy development. Furthermore, the number of the applications to be integrated is very much limited. With emerging technologies and humungous web solutions, the currently available methods are not efficient in providing SSO to these applications. In addition to the above, these techniques require niche skill set as well.

Hence, there is a need for a system and method to enable an effective and easy single sign-on for users into a plurality of thick-client applications using an external application or a third-party application.

The abovementioned shortcomings, disadvantages and problems are addressed herein, which will be understood by reading and studying the following specification.

OBJECTS OF THE EMBODIMENTS HEREIN

The primary object of the embodiments herein is to provide a system and method to enable a single sign-on into a plurality of thick-client applications through an external application.

Another object of the embodiments herein is to provide a system and method to enable the single sign-on to a plurality of thick-client applications without effecting any changes in the application to be accessed.

Yet another objective of embodiments herein is to provide a system and method to enable the single sign-on for thick-client applications using an external application that parses an application login page for performing a sign on.

Yet another objective of the embodiments herein is to provide a system and method to enable the single sign-on for thick-client applications using an external application that retrieves dynamic authentication data from a stored server (Sign on Express) and automatically enables the sign-on to the respective applications.

Yet another objective of the embodiments herein is to provide a system and method that enables the single sign-on to a plurality of thick-client applications and encapsulates the complexity of the business logic from the user onboarding the application.

Yet another objective of the embodiments herein is to provide a system and method to enable the single sign-on to a plurality of thick-client applications such as legacy applications, enterprise applications, emerging web standards such as HTML5, B2C based applications etc.

Yet another objective of the embodiments herein is to provide a system and method for reducing a code footprint.

Yet another objective of the embodiments herein is to provide a system and method to support a plurality of client/server operating systems without any change in the script code.

These and other objects and advantages of the embodiments herein will become readily apparent from the following detailed description taken in conjunction with the accompanying drawings.

SUMMARY

The various embodiments herein provide a system and method to enable a single sign-on into a plurality of thick-client applications through an external application.

According to an embodiment herein, a system is provided for enabling single sign-on for a user on plurality thick client applications through an external application. The system includes a receiving module, an authentication module, an encryption module, a launching module, a display module, and a storage module.

According to an embodiment herein, the receiving module is configured to receive a request from a plurality of thick-client application, and the request includes information of the plurality of thick-client applications. According to an embodiment herein, the receiving module prompts a user to enter the login credentials of the plurality of thick client application for the first time. The login credentials include at least a username and a password.

The authentication module is configured to authenticate the user credentials for the plurality of thick client applications. According to an embodiment herein, the authentication module parses a pre-defined syntax of a thick-client application and allows the user to use the obtained credentials as an object to write an authentication logic using the object and perform an authentication logic using the pre-defined syntax over thick client applications.

The encryption module is configured to encrypt the user credentials for the plurality of thick client applications. The encryption for each client device is unique per installation, and the encryption is generated during the installation.

The launching module is configured to launch a plurality of thick client applications. The launching module launches the plurality of thick client applications via an event-driven protocol agent along with command line parameters.

The display module is configured to display the user credentials for launching the plurality of thick client applications. According to an embodiment herein, the display module displays the user credentials in a hidden format, and the user has an option to reveal the user credentials.

The database is configured to store the authenticated login credentials of a plurality of thick client applications.

According to an embodiment herein, the launching module detects the credentials of the user and fills the credentials of the user. According to an embodiment herein, the receiving module receives the pre-determined login credentials of the user through an externalized JavaScript. The externalized JavaScript is altered optionally by a local administrator of the single sign-on, when one thick-client changes the process of receiving the pre-determined login credentials.

The various embodiments herein provide a method for enabling single sign-on for a user on a plurality of thick-client applications through an external application. The method involves receiving user credentials of a plurality of thick client application through a receiving module; authenticating the user credentials for a plurality of thick-client applications through an authentication module; encrypting the user credentials for the plurality of thick-client applications through an encryption module; launching the plurality of thick-client applications, displaying the user credentials for launching the plurality of thick-client applications through display module; and storing the authenticated login credentials of a plurality of thick client applications.

According to an embodiment herein, the predetermined login credentials of a plurality of thick-client applications include at least a registered e-mail identity and a password. The receiving module prompts the user to enter the login credentials of the plurality of thick-client application for the first time.

According to an embodiment herein, the plurality of thick-client applications is authenticated by parsing a pre-defined syntax of a thick-client application and allowing the user to use the user credentials obtained as an object. An authentication logic is written using the object. The authentication logic is executed using the predefined syntax over the thick-client applications.

According to an embodiment herein, a step of encrypting the user credentials is unique per installation, and wherein the encryption is generated during the installation.

According to an embodiment herein, the plurality of thick-client applications is launched via an event-driven protocol agent along with a command line parameters by a launching module.

According to an embodiment herein, the display module exhibits the user credentials in a hidden format. The user has the option to reveal the user credentials. Further, the database stores the authenticated login credentials of a plurality of thick client applications.

According to an embodiment herein, the predetermined login credentials are received through an externalized JavaScript and the externalized JavaScript enables the user to edit the JavaScript without re-installing the external application each time. According to an embodiment herein, the externalized JavaScript is altered optionally by a local administrator of the single sign-on application, when the web application changes the process of receiving the login credentials.

According to an embodiment herein, the method further comprises retrieving the authentication details from a plurality of thick-client applications for enabling the single sign-on to each of the thick-client application.

According to an embodiment herein, the method further comprises accessing the plurality of thick-client applications directly when the external extension is disabled.

According to an embodiment herein, a thick-client application are software applications that do not require a connection to a server system in order to run and is largely independent. According to an embodiment herein, the thick-client applications often have their own operating system and software applications and is generally used offline.

According to an embodiment herein, the external application refers to the application that is not native to the computable device. According to an embodiment herein, the external application is pre-installed in the computable device for providing single sign on to the plurality of the thick-client applications.

According to another embodiment herein, the external application has to be downloaded externally for providing single sign on to the plurality of the thick-client application. According to an embodiment herein, the external application is downloaded/installed on the computable device either locally or through remote installation. According to an embodiment herein, the external application includes the sign on the express agent that detects the prompt screen and fetches the user credentials from the sign on server.

According to an embodiment herein, the user logs on to the computing device and launches a thick-client application. Examples of the thick-client application include but are not limited to desktop application, mobile application, Microsoft Office®, and the like.

Further, the thick-client application such as the desktop application prompts the user to enter user credentials. According to an embodiment herein, the user credentials include a username and the password.

Subsequent to the desktop application prompt, the sign-on express agent, which is the external application, detects the application login and fetches the user credentials from the sign-on server. According to an embodiment herein, the steps of detecting the application log and fetching the user credentials from the sign-on server are performed with one or more standard protocols.

According to an embodiment herein, the sign-on express agent, which is the external application, injects the user credentials from the sign-on server to the client device. According to an embodiment herein, the user enters the user credentials once to access the thick-client application initially. According to an embodiment herein, injecting the user credentials is through one or more standard protocols.

According to an embodiment herein, the user instructs the sign-on express agent to inject the credentials to all thick-client applications installed on the computing device. According to another embodiment herein, the user instructs the sign-on express agent to inject the credentials to one or more selected thick-client applications on the computing device.

Although the embodiments herein are described with various specific embodiments, it will be obvious for a person skilled in the art to practice the embodiments herein with modifications.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
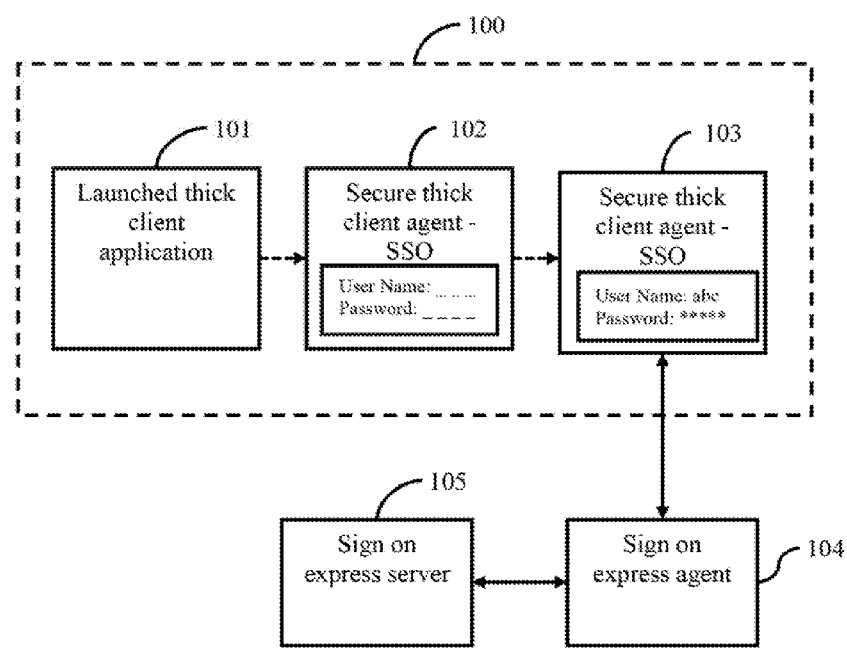
FIG. 1 illustrates a block diagram of a system provided with a user interface for enabling single sign-on into a plurality of thick-client applications through an external application, according to one embodiment herein

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide a system and method to enable a single sign-on into a plurality of thick-client applications through an external application.

According to an embodiment herein, a system is provided for enabling single sign-on for a user on plurality thick client applications through an external application. The system includes a receiving module, an authentication module, an encryption module, a launching module, a display module, and a storage module.

According to an embodiment herein, the receiving module is configured to receive a request from a plurality of thick-client application, and the request includes information of the plurality of thick-client applications. According to an embodiment herein, the receiving module prompts a user to enter the login credentials of the plurality of thick client application for the first time. The login credentials include at least a username and a password.

The authentication module is configured to authenticate the user credentials for the plurality of thick client applications. According to an embodiment herein, the authentication module parses a pre-defined syntax of a thick-client application and allows the user to use the obtained credentials as an object to write an authentication logic using the object and perform an authentication logic using the pre-defined syntax over thick client applications.

The encryption module is configured to encrypt the user credentials for the plurality of thick client applications. The encryption for each client device is unique per installation, and the encryption is generated during the installation.

The launching module is configured to launch a plurality of thick client applications. The launching module launches the plurality of thick client applications via an event-driven protocol agent along with command line parameters.

The display module is configured to display the user credentials for launching the plurality of thick client applications. According to an embodiment herein, the display module displays the user credentials in a hidden format, and the user has an option to reveal the user credentials.

The database is configured to store the authenticated login credentials of a plurality of thick client applications.

According to an embodiment herein, the launching module detects the credentials of the user and fills the credentials of the user. According to an embodiment herein, the receiving module receives the pre-determined login credentials of the user through an externalized JavaScript. The externalized JavaScript is altered optionally by a local administrator of the single sign-on. when one thick-client changes the process of receiving the pre-determined login credentials.

The various embodiments herein provide a method for enabling single sign-on for a user on a plurality of thick-client applications through an external application. The method involves receiving user credentials of a plurality of thick client application through a receiving module; authenticating the user credentials for a plurality of thick-client applications through an authentication module; encrypting the user credentials for the plurality of thick-client applications through an encryption module; launching the plurality of thick-client applications; displaying the user credentials for launching the plurality of thick-client applications through display module; and storing the authenticated login credentials of a plurality of thick client applications.

According to an embodiment herein, the predetermined login credentials of a plurality of thick-client applications include at least a registered e-mail identity and a password. The receiving module prompts the user to enter the login credentials of the plurality of thick-client application for the first time.

According to an embodiment herein, the plurality of thick-client applications is authenticated by parsing a pre-defined syntax of a thick-client application and allowing the user to use the user credentials obtained as an object. An authentication logic is written using the object. The authentication logic is executed using the predefined syntax over the thick-client applications.

According to an embodiment herein, a step of encrypting the user credentials is unique per installation, and wherein the encryption is generated during the installation.

According to an embodiment herein, the plurality of thick-client applications is launched via an event-driven protocol agent along with a command line parameters by a launching module.

According to an embodiment herein, the display module exhibits the user credentials in a hidden format. The user has the option to reveal the user credentials. Further, the database stores the authenticated login credentials of a plurality of thick client applications.

According to an embodiment herein, the predetermined login credentials are received through an externalized JavaScript and the externalized JavaScript enables the user to edit the JavaScript without re-installing the external application each time. According to an embodiment herein, the externalized JavaScript is altered optionally by a local administrator of the single sign-on application, when the web application changes the process of receiving the login credentials.

According to an embodiment herein, the method further comprises retrieving the authentication details from a plurality of thick-client applications for enabling the single sign-on to each of the thick-client application.

According to an embodiment herein, the method further comprises accessing the plurality of thick-client applications directly when the external extension is disabled.

According to an embodiment herein, a thick-client application are software applications that do not require a connection to a server system in order to run and is largely independent. According to an embodiment herein, the thick-client applications often have their own operating system and software applications and is generally used offline.

According to an embodiment herein, the external application refers to the application that is not native to the computable device. According to an embodiment herein, the external application is pre-installed in the computable device for providing single sign on to the plurality of the thick-client applications.

According to another embodiment herein, the external application has to be downloaded externally for providing single sign on to the plurality of the thick-client application. According to an embodiment herein, the external application is downloaded/installed on the computable device either locally or through remote installation. According to an embodiment herein, the external application includes the sign on the express agent that detects the prompt screen and fetches the user credentials from the sign on server.

According to an embodiment herein, the user logs on to the computing device and launches a thick-client application. Examples of the thick-client application include but are not limited to desktop application, mobile application, Microsoft Office®, and the like.

Further, the thick-client application such as the desktop application prompts the user to enter user credentials. According to an embodiment herein, the user credentials include a username and the password.

Subsequent to the desktop application prompt, the sign-on express agent, which is the external application, detects the application login and fetches the user credentials from the sign-on server. According to an embodiment herein, the steps of detecting the application log and fetching the user credentials from the sign-on server are performed with one or more standard protocols.

According to an embodiment herein, the sign-on express agent, which is the external application, injects the user credentials from the sign-on server to the client device. According to an embodiment herein, the user enters the user credentials once to access the thick-client application initially. According to an embodiment herein, injecting the user credentials is through one or more standard protocols.

According to an embodiment herein, the user instructs the sign-on express agent to inject the credentials to all thick-client applications installed on the computing device. According to another embodiment herein, the user instructs the sign-on express agent to inject the credentials to one or more selected thick-client applications on the computing device.

FIG. 1 illustrates a block diagram of a system provided with a user interface for enabling single sign-on into one or more of thick-client applications through an external application. With respect to the FIG. 1, the system includes a display screen 100 of a computing device of a user. According to an embodiment herein, the computing device refers to a device on which the user interfaces and operates with a plurality of the thick-client applications. According to an embodiment herein, the computing devices include but are not limited to a computer, laptop, mobile phone, Personal Digital Assistants (PDAs), smart television, wearable devices, and the like.

According to an embodiment herein, the user selects the one or more thick-client applications that have to be operated. According to an embodiment herein, the user selects the one or more thick-client application using the graphical user interface (GUI). According to another embodiment herein the user selects the one or more thick-client application by entering a code set in the required console.

According to an embodiment herein, the one or more thick-client applications are launched when the user selects the one or more thick-client applications. Further, when the thick-client application is launched, a launch screen of the selected thick-client application 101 is displayed on the display screen 100.

With respect to FIG. 1, the system includes a prompt screen 102 for entering the user credentials for accessing the selected thick-client application. According to an embodiment herein, the display screen 100 prompts the user to enter the user credentials through a secure agent 102. According to an embodiment herein, the user credentials include but are not limited to user name and password.

With respect to FIG. 1, the system includes a prompt screen 103, injected with the user credentials. Subsequent to the prompt for entering user credentials, a sign-on express agent 104 injects the user credentials on the prompt screen 103. According to an embodiment herein, the sign on the express agent is an external or third party application that is downloaded to the computable device. According to another embodiment herein, the administrator pushes the sign on express external application to be downloaded on the computable device using one or more ways.

With respect to FIG. 1, the system includes a sign on express agent 104. The sign on express agent 104 is an external application which is downloaded to the computing device. According to an embodiment herein, the sign on express agent 104 detects the prompt for entering the user credentials using one or more standard detecting algorithms.

With respect to FIG. 1, the system includes a sign on server 105. According to an embodiment herein, the sign on server 105 stores a plurality of the user credentials for the plurality of the thick-client applications. According to an embodiment herein, the user credentials are stored in the sign-on server 105 when the user provides the user credentials during the initial use of each of the thick-client application.

According to an embodiment herein, the sign on express agent 104 fetches the details of the user credentials from the sign on server 105. According to an embodiment herein, the sign on express agent 104 fetches the details of the user credentials from the sign on server 105 through a communication network (not shown in the figure). According to an embodiment herein, the communication network include but are not limited to wired network. wireless network, Local Area Network (LAN), Wide Area Network (WAN), Metropolitan Area Network (MAN), and the like.

According to an embodiment herein, the sign on express agent 104 detects the prompt screen 102, fetches the user credentials from the sign on server 105, and injects the user credentials on the prompt screen 103 using one or more standard protocols. According to an embodiment herein, the sign on the express agent is local to the computing device.

Figure 2:
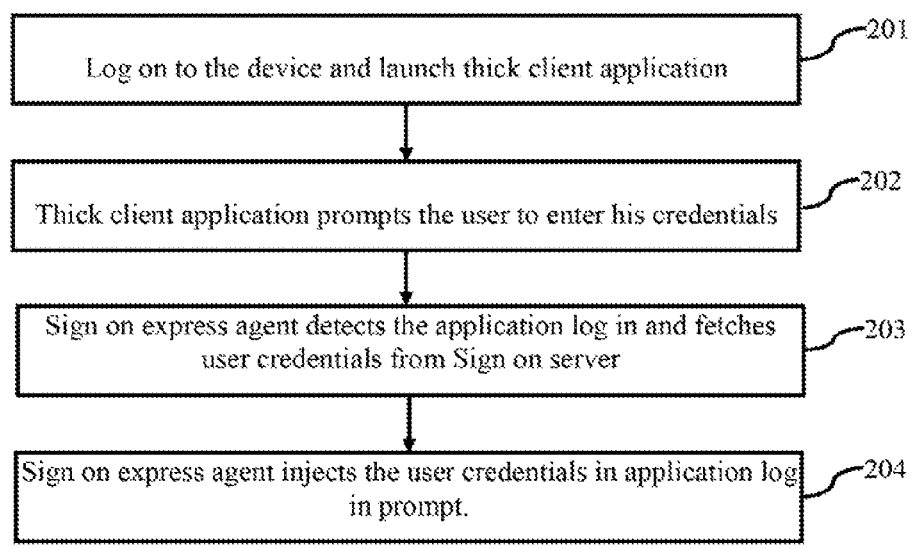
FIG. 2 illustrates a process flow chart explaining the method for single sign-on into a plurality of thick-client applications through an external application, according to one embodiment herein.

FIG. 2 illustrates a flow chart explaining the method for single sign-on into a plurality of thick-client applications using an external application, according to an embodiment herein.

According to an embodiment herein, the external application refers to the application that is not native to the computing device. According to an embodiment herein, the external application for providing single sign on to the plurality of the thick-client applications is pre-installed in the computing device.

According to an embodiment herein, the external application for providing single sign on to the plurality of the thick-client application has to be downloaded externally. According to an embodiment herein, the external application is downloaded/installed on the computing device either locally or through remote installation. According to an embodiment herein, the external application includes the sign on the express agent that detects the prompt screen and fetches the user credentials from the sign on server.

According to an embodiment herein, the user logs on to the computing device and launches a thick-client application (Step 201). Examples of the thick-client application include but are not limited to desktop application, mobile application, Microsoft Office®, and the like.

Further, the thick-client application such as the desktop application prompts the user to enter user credentials (Step 202). According to an embodiment herein, the user credentials include username and the password.

Subsequent to the desktop application prompt, the sign-on express agent, which is the external application, detects the application login and fetches the user credentials from the sign-on server (Step 204). According to an embodiment herein, the detecting the application log and fetching the user credentials from the sign-on server is through one or more standard protocols.

According to an embodiment herein, the sign-on express agent which is the external application injects the user credentials from the sign-on server (Step 205). According to an embodiment herein, the user enters the user credentials once to access the thick-client application initially. According to an embodiment herein, injecting the user credentials is through one or more standard protocols.

According to an embodiment herein, the user instructs the sign-on express agent to inject credentials to all thick-client applications installed on the computing device. According to another embodiment herein, the user instructs the sign-on express agent to inject credentials to one or more selected thick-client applications on the computing device.

Figure 3:
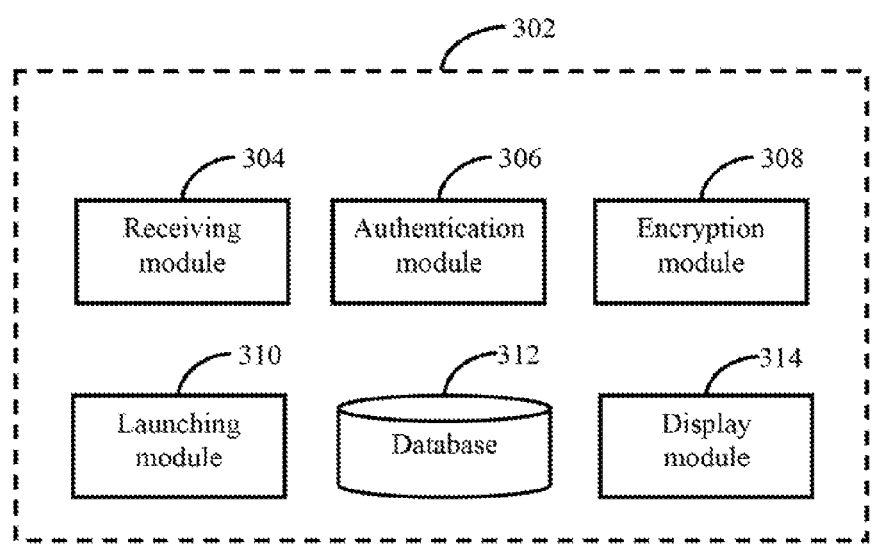
FIG. 3 illustrates a block diagram of a system for enabling the single sign-on to the plurality of thick-client applications, according to an embodiment of the herein.

FIG. 3 illustrates a block diagram of a system for enabling the single sign-on to the plurality of thick-client applications, according to an embodiment of the herein. The system includes a receiving module 304, an authentication module 306, an encryption module 308, a launching module 310, a database 312, and a display module 314.

The receiving module 304, receives the request from a client device for enabling the single sign-on for a thick client application. Further, the receiving module also receives the user credentials required for launching the plurality of thick client applications. According to an embodiment herein, the receiving module prompts the user to enter the user credentials for the first time. The user credentials include a plurality of fields including a username and password field.

The receiving module 304 also prompts the user to enter other credentials such as a security question, location of the user, alternate e-mail id, and the like. According to an embodiment herein, the receiving module resides on the client device. According to an embodiment herein, the client device resides on the server and is connected to a thick-client agent. The receiving module 302 is coupled to the authentication module 304.

The authentication module 304 authenticates the credentials of the user to enable the single sign-on for the plurality of thick client applications. According to an embodiment herein, the authentication module 304 parses the pre-defined syntax of the thick-client application and allows the users to user the credentials obtained as an object and using the object to write and perform an authentication logic using a pre-defined syntax over the plurality of thick client applications.

According to an embodiment herein, when the authentication for the plurality of thick-client application fails, the user is notified and prompted to enter the credentials again. According to an embodiment herein, when the entered credentials are matching with the original credentials of the thick-client applications, the application is added to the database 312 for enabling single sign-on process for the plurality of thick-client applications. According to an embodiment herein, the authentication is performed using a plurality of standard authentication protocols. Once the user credentials for the plurality of thick client applications are authenticated, the data is transmitted to the encryption module 308.

The encryption module 308 encrypts the user credentials for securing the user privacy and security. The encryption module 308 encrypts the user credentials using a plurality of standard encryption methods. An example of an encryption method is using AES algorithm for securing the user credentials. According to an embodiment herein, the encryption for each client device containing the plurality of thick-client applications is unique. Further, the encryption is generated during the installation of the application.

The system includes the launching module 310 configured to launch the plurality of thick-client applications on the client device. According to an embodiment herein, the plurality of thick-client applications are launched through a dedicated launch-pad application. The plurality of thick-client application is launched via an event-driven protocol agent such as Node.js along with command line parameters.

The launching module 210 is coupled to the display module 312 for displaying the user credentials for the launched thick-client applications. According to an embodiment herein, the display module 312 also displays a plurality of updates regarding the single sign-on process for the thick-client applications. According to an embodiment herein, the display module displays the user credentials for the single sign-on in a hidden format. The user has an option to reveal the user credentials for launching the plurality of thick client applications.

The system includes the database 312 for storing a plurality of information of the single sign-on process. The information stored in the database 312 includes but are not limited to the authenticated login credentials for the plurality of thick-client applications, metadata of the plurality of thick client applications, the number of thick-client applications for which the single sign-on is enabled, and the like. The plurality of system modules operates in a synchronized manner for enabling the process of single sign-on for the thick client applications.

The various embodiments herein provide a method for enabling single sign-on for the plurality of thick-client applications. The method includes receiving the pre-determined login credentials for the plurality of thick-client applications through the receiving module; authenticating the user credentials for plurality of thick-client applications; encrypting the user credentials for the plurality of thick-client applications through an encryption module; launching the plurality of thick-client applications and wherein the steps of launching the plurality of thick-client applications, displaying the user credentials for launching the plurality of thick-client applications through display module, and storing the information related to the single sign-on process for the plurality of the thick-client applications.

According to an embodiment herein, login credentials are received through an external application downloaded on the client device. The pre-determined login credentials include details of the user including the registered e-mail id and the password for the thick-client applications. According to an embodiment herein, the user is prompted to enter the credentials for the first time.

Once the user credentials are received, the login credentials are authenticated using the authentication module. The details received are parsed and allows the user to use the user credentials obtained as an object and using the object to write an authentication logic and perform an authentication logic using the pre-defined syntax over the thick-client applications.

Once the details of the user are authenticated, the user credentials for the plurality of thick-client applications are encrypted through an encryption module. According to an embodiment herein, the user credentials are encrypted uniquely per installation, and the encryption is generated during the installation.

Further, once the user credentials are authenticated, the plurality of thick-client applications are launched through a launch-pad installed on the client device. According to an embodiment herein, the thick-client applications are launched via an event-driven protocol agent along with a command line parameters through the launching module.

According to an embodiment herein, the predetermined login credentials are received through an externalized JavaScript. The externalized JavaScript enables the user to edit the JavaScript without re-installing the external application each time. According to an embodiment herein, the externalized JavaScript is received optionally by a local administrator of the single sign-on application when the web application changes the process of receiving the login credentials.

According to an embodiment herein, the user initiates the single sign-on to thick client application by clicking on the application icon on the Launchpad of the product which is the central point to launch applications that is available to the user after successful login. A HTTP based AJAX request is initiated to check whether the credentials already exists for the application is followed, when a multi-factor authentication is enabled. AJAX response is received stating whether the application credentials exist along with status of multi-factor enablement. Based on the credential configuration by the administrator (product supports application credentials to be either provided by the user or administrator or dynamically fetched from LDAP) user may be prompted to provide application credentials for the first time.

According to an embodiment herein, the user provides the credentials and proceeds. The credentials are saved in server-side database via HTTP based AJAX request. After saving the credentials in server-side database, a Javascript based event is initiated which in turn is captured by a browser extension. Javascript event contains data related to thick client i.e. thick-client process name, installation location (optional), application credentials, application login details i.e. command line login parameters or application's UI screen information.

According to an embodiment herein, the browser extension after capturing the event, extracts the thick-client application related data from the same and posts it to NODE.JS agent listening on the device of the user as an HTTP based AJAX call. NODE.JS receives the HTTP request from the extension and launches the thick-client process. If thick client application supports login via command line then NODE.JS agent launches the thick client process along with necessary command line parameters else it will detect the login fields on the login screen and fills in the user credentials.

According to an embodiment herein, the system stores the users credentials on server-side database and encrypts the same using AES-256 standard. Key to encrypt/decrypt the user credentials is unique per installation/setup of external application and is generated at the time of installation/setup. Further, the single sign-on using browser extension makes use of HTTPS/TLS protocol for request/response.

According to an embodiment herein, the end user provides the credentials for the first time during a initiation of sign on and credentials are stored in server-side database. When the stored credentials expires, then user resets them via external application's user interface. Further, when user wants to view the credentials specially password for a specific application administrator can enable "Reveal Password" option on the same. According to an embodiment herein, in order for the user to view his credentials via "Reveal Password" option to re-authenticate to the single sign-on process.

The various embodiments herein provide a web based and thick-clients based applications from a centralized browser based view. The embodiments herein provide a system and method for integrating the plurality of thick-client applications via command line or via form filling on thick client application's user interface. The embodiments herein provide a system and method to enable single sign-on into a plurality of thick-client applications through an external application. The system and method provides a lesser code footprint. It allows the external application to be compatible with one or more platforms. There is no change in the script for the single sign-on when performed on various platforms. The system and method are can be integrated with other external applications.

Although the embodiments herein are described with various specific embodiments, it will be obvious for a person skilled in the art to practice the embodiments herein with modifications.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

What is claimed is:

1. A system for enabling single sign-on for a user on plurality thick client applications through an external application, the system comprises:
   a receiving module configured to receive a request from a plurality of thick-client applications, and wherein the request includes information of the plurality of thick-client applications, and wherein the receiving module prompts a user to enter the login credentials of the plurality of thick-client application for the first time, and wherein the login credentials includes a user name and a password;
   an authentication module configured to authenticate the user credentials for the plurality of thick-client applications, and wherein the authentication module parses a pre-defined syntax of a thick-client application and allows the user to use the credentials obtained as an object to write an authentication logic and perform an authentication logic using the predefined syntax over thick-client applications;
   an encryption module configured to encrypt the user credentials for the plurality of thick-client applications, and wherein the encryption for each client device is performed unique per installation, and wherein the encryption is generated during the installation;
   a launching module configured to launch the plurality of thick-client applications, wherein the launching module launches a plurality of thick-client application via an event-driven protocol agent along with a command line parameters;
   a display module configured to display the user credentials for launching the plurality of thick-client applications, and wherein the display module displays the user credentials in a hidden format, and wherein the user has an option to reveal the user credentials; and
   a database configured to store the authenticated login credentials of a plurality of thick client applications.

2. The system according to claim 1, wherein the launching module detects the credentials of the user and fills the credentials of the user.

3. The system according to claim 1, wherein the receiving module receives the pre-determined login credentials of the user through an externalized JavaScript.

4. The system according to claim 1, wherein the externalized JavaScript is altered optionally by a local administrator of the single sign-on, when one thick-client changes the process of receiving the pre-determined login credentials.

5. A computer implemented method comprising instructions stored on a non-transitory computer readable storage medium and executed on a computing device comprising a hardware processor and a memory for enabling a single sign-on for a user on a plurality of thick-client applications through an external application, the method comprises:
   receiving pre-determined login credentials of a plurality of thick-client applications through a receiving module, and wherein the pre-determined login credentials of a plurality of thick-client applications include at least a registered e-mail identity and a password, and wherein the receiving module prompts the user to enter the login credentials of the plurality of thick-client application for the first time;
   authenticating the user credentials for plurality of thick-client applications through an authentication module, and wherein the plurality of thick-client applications is authenticated by parsing a predefined syntax of a thick-client application and allowing the user to use the user credentials obtained as an object and using the object to write an authentication logic and performing the authentication logic using the predefined syntax over thick-client applications;
   encrypting the user credentials for the plurality of thick-client applications through an encryption module, and wherein encrypting the user credentials is done uniquely per installation, and wherein the encryption is generated during the installation;
   launching the plurality of thick-client applications, and wherein the plurality of thick-client applications is launched via an event-driven protocol agent along with a command line parameters through a launching module;
   displaying the user credentials for launching the plurality of thick-client applications through display module, and wherein the display module displays the user credentials in a hidden format, and wherein the user has an option to reveal the user credentials; and
   storing the authenticated login credentials of a plurality of thick client applications.

6. The method according to claim 5, wherein the pre-determined login credentials are received through an externalized JavaScript, and wherein the externalized JavaScript enables the user to edit the JavaScript without re-installing the external application each time.

7. The method according to claim 5 further comprises altering the externalized JavaScript optionally by a local administrator of the single sign-on application when the thick-client application changes the process of receiving the login credentials.

8. The method according to claim 5, further comprises retrieving the authentication details from a plurality of thick-client applications for enabling the single sign-on to each of the thick-client application.

9. The method according to claim 5 further comprises accessing the plurality of thick-client applications directly when the external application is disabled.

* * * * *